US009834328B2

(12) United States Patent
Madsen

(10) Patent No.: US 9,834,328 B2
(45) Date of Patent: Dec. 5, 2017

(54) HEATING-NOZZLE ARRANGEMENT

(71) Applicant: TETRA LAVAL HOLDINGS & FINANCE S.A., Pully (CH)

(72) Inventor: Bent Madsen, Solrød Strand (DK)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/106,765

(22) PCT Filed: Dec. 19, 2014

(86) PCT No.: PCT/EP2014/078785
§ 371 (c)(1),
(2) Date: Jun. 20, 2016

(87) PCT Pub. No.: WO2015/091974
PCT Pub. Date: Jun. 25, 2015

(65) Prior Publication Data
US 2017/0001738 A1  Jan. 5, 2017

(30) Foreign Application Priority Data
Dec. 20, 2013  (SE) ...................................... 1351549

(51) Int. Cl.
*B31B 1/64* (2006.01)
*B31B 3/64* (2006.01)
(Continued)

(52) U.S. Cl.
CPC .............. *B65B 7/16* (2013.01); *B29B 13/025* (2013.01); *B29C 65/103* (2013.01);
(Continued)

(58) Field of Classification Search
CPC ..... B31B 2201/6026; B31B 3/64; B31B 1/64; B31B 2219/603
(Continued)

(56) References Cited

U.S. PATENT DOCUMENTS 3,824,702 A * 7/1974 Farfaglia ................. B29C 65/48
34/104
3,825,408 A * 7/1974 Farfaglia ................. B29C 66/80
156/497
(Continued)

FOREIGN PATENT DOCUMENTS

EP       0537962 A1   4/1993
JP       55-102525 U  7/1980
(Continued)

OTHER PUBLICATIONS

International Search Report (PCT/ISA/210) dated Mar. 13, 2015, by the Japanese Patent Office as the International Searching Authority for International Application No. PCT/EP2014/078785.
(Continued)

*Primary Examiner* — Gregory A Wilson
(74) *Attorney, Agent, or Firm* — Buchanan Ingersoll & Rooney PC

(57) ABSTRACT

A heating-nozzle arrangement for heating a partly formed packaging container, comprises one or more nozzle assemblies, arranged to direct a heated air flow to portions of a packaging container to be sealed; a gas-supply portion, arranged to supply a mass flow of heated gas to the nozzle assembly, further the nozzle assembly comprises at least a first and a second hole pattern and that the heating-nozzle arrangement further comprises a selector for directing the mass flow of heated air towards the first hole pattern or the second hole pattern respectively.

20 Claims, 3 Drawing Sheets

(51) Int. Cl.
*B65B 7/16* (2006.01)
*B29C 65/10* (2006.01)
*B29B 13/02* (2006.01)
*B29C 65/00* (2006.01)
*B65B 51/20* (2006.01)
*B65D 5/06* (2006.01)
*B29L 31/00* (2006.01)

(52) U.S. Cl.
CPC ...... *B29C 66/43122* (2013.01); *B29C 66/841* (2013.01); *B29C 66/9161* (2013.01); *B65B 51/20* (2013.01); *B65D 5/067* (2013.01); *B29C 66/7234* (2013.01); *B29C 66/72321* (2013.01); *B29C 66/72328* (2013.01); *B29C 66/72341* (2013.01); *B29C 66/72343* (2013.01); *B29L 2031/7166* (2013.01)

(58) Field of Classification Search
USPC ........ 432/224, 225, 230; 493/129, 132, 133, 493/332; 53/477
See application file for complete search history.

(56) References Cited

U.S. PATENT DOCUMENTS

| | | | | |
|---|---|---|---|---|
| 5,230,204 A | * | 7/1993 | Hall | B29C 66/1122 493/134 |
| 5,618,253 A | * | 4/1997 | Okushita | B65B 51/20 493/134 |
| 5,868,567 A | * | 2/1999 | Abe | B29B 13/025 432/224 |
| 6,149,566 A | * | 11/2000 | Nishio | B29B 13/025 493/133 |
| 6,648,636 B2 | * | 11/2003 | Kanematsu | B29B 13/025 432/224 |
| 2004/0207492 A1 | | 10/2004 | Nguyen et al. | |

FOREIGN PATENT DOCUMENTS

JP  2006-082844 A  3/2006
WO  WO 2005/015735 A1  2/2005

OTHER PUBLICATIONS

Written Opinion (PCT/ISA/237) dated Mar. 13, 2015, by the Japanese Patent Office as the International Searching Authority for International Application No. PCT/EP2014/078785.
Swedish Search Report dated Jun. 12, 2014, issued by the Swedish Patent Office in the corresponding Swedish Patent Application No. 1351549-9. (6 pages).

* cited by examiner

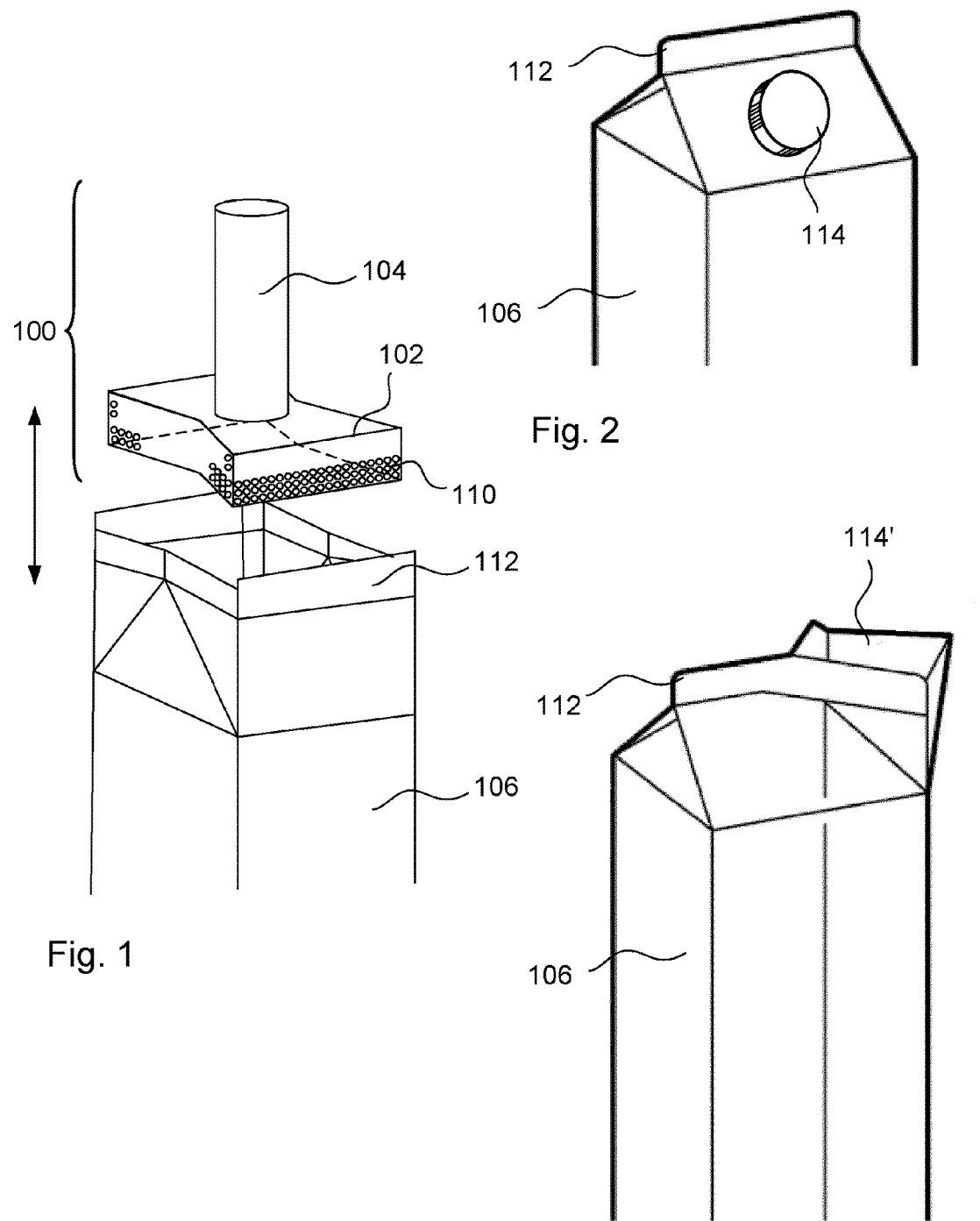

106

HEATING-NOZZLE ARRANGEMENT

FIELD OF THE INVENTION

The present invention relates to sealing devices, and in particular to a heating-nozzle arrangement for use in sealing devices.

TECHNICAL BACKGROUND

The core of the present invention resides in the area of sealing packaging containers made from a packaging laminate. Sealing then refers to the closing of an open end of the packaging container. This "open end" will be the end which will form the top of the packaging container.

Though not forming any part of the present invention it may be worthwhile to mention a few words of the packaging laminate. The packaging laminate generally comprises a core of fibre material, a paper board, sandwiched between additional layers for providing further beneficial properties. These additional layers may comprise thermoplastic layers forming a barrier against liquid, and to some extent to gases, such as oxygen, and aluminium layers forming a barrier against light and gases, again oxygen may be mentioned as an example. Further layers may include adhesives etc. The field of packaging laminates is well explored and new packaging laminates emerge regularly. A relatively common feature is that packaging containers made from such a packaging laminate are sealed with the aid of an outermost plastic layer of the packaging laminate. Starting from a sheet or web of packaging material a sleeve or tube is formed by fusing two opposing edges of the sheet or web. The fusing is performed in the same way as the sealing, i.e. by heating the outermost plastic layers in the areas to be sealed followed by pressing the areas towards each other. It may be noted that the "outermost layer" is meant to designate an outermost layer of the packaging laminate as such, and for a sheet of packaging laminate there are generally two layers being the "outermost layer"; one on each side of the sheet. Furthermore, the outermost layer may obviously be located on the interior side of a packaging container folded from the packaging laminate.

Referring back to the heating and pressing, the order of events may be shifted such that the pressing is started before the heating. Common heating methods are heating with a flow of hot air, heating by ultrasonic radiation (basically friction), and induction heating. Numerous publications disclose details of various heating techniques, various packaging laminates and so forth.

The thus formed sleeve is sealed in one end, commonly by using one of the techniques mentioned, after which it if filled with a product and sealed at the remaining open end. Depending on the type of packaging container there are different techniques that are used.

The text passages above have the purpose of giving a brief introduction to the technical field within which the present invention resides and the information is considered well-known to the skilled person.

The present invention is associated with the narrow area of heating the packaging laminate prior to sealing one end thereof, and though the advantages were discovered in connection to one particular type of packaging container the invention as such may be used in relation to other packaging containers where it is suitable.

The particular type of packaging container mentioned is a gable-top container. This type of packaging container is well-known since almost a century and still commonly used. There is an abundance of publications relating to gable-top containers, yet in a few words the gable-top container is formed from a packaging laminate blank, i.e. a rectangular piece of packaging material. The blank is creased or scored to facilitate folding, and two opposing edges are sealed together in this case called 5. Panel for formation of a sleeve, a flattened sleeve to be more exact, still having an open top end and an open bottom end (top and bottom referring to the function of the ends in relation to a finished packaging container. The thus formed sleeve is fed to a filling machine in this flattened state, and in the filling machine the flattened sleeve is risen to a sleeve having a square or rectangular cross section, after which it is arranged on a mandrel of a mandrel wheel. While on the mandrel wheel the bottom end of the sleeve is heated by means of hot air and sealed by folding the open bottom end according to a particular bottom configuration, of which there are several to choose from. This partly formed packaging container is removed from the mandrel and is arranged on a conveyor with the top end directed upwards, and while arranged on the conveyor the packaging container is sterilized and filled. After filling the still open end of the packaging container is to be sealed, and since we are now closing in on the particular field of the present invention this step will be described in some more detail. When sealing the bottom end the folded end is pressed with great force against an anvil (on the mandrel) and an adequate seal is accomplished with relative ease. The top end is a bit more delicate, since the top end has to be properly sealed while still providing an opening for pouring out the product. Such opening may a separately provided plastic closure arranged in or on a hole configuration on one of the gable panels yet the opening may also be provided by a consumer tearing apart a specific part of the sealed area in the top end, in a manner well-known for anyone having opened a gable-top container before the time of plastic closures.

The edges to be sealed are heated by means of a delicately designed nozzle, and the flow of hot air is dependent on the type of material of the packaging laminate, the type of opening device to be arranged etc. There are several examples of such nozzles in the literature, one example including EP0526069 by the present applicant. Each nozzle is tailor made for its purpose, e.g. individually designed in relation to a particular package size, a particular top configuration, a particular closure, etc.

The present invention relates to an improved heating nozzle arrangement.

SUMMARY

In an effort to eliminate or alleviate problems in relation to prior art and to provide an improved heat-nozzle arrangement the present invention relates to a heating-nozzle arrangement for heating a partly formed packaging container. The arrangement comprises one or more nozzle assemblies arranged to direct a heated air flow to portions of a packaging container to be sealed, and a gas air-supply portion, arranged to supply a mass flow of heated air to the nozzle assembly. The heat-nozzle arrangement is characterized in that the nozzle assembly comprises at least a first and a second hole pattern and that the heating-nozzle arrangement further comprises a selector for directing the mass flow of heated air towards the first hole pattern or the second hole pattern respectively.

The present invention allows for a change of flow pattern to be performed rapidly and accurately, and does not necessitate the use of complex control arrangements. Further advantages should be readily appreciated when studying the detailed description.

In one or more embodiments it may be preferred that a first operation production condition includes the first hole pattern and the second hole pattern, while a second production condition will demand another hole pattern, such that the second operation condition includes the first hole pattern only, wherein the selector is used to change between these two operating conditions. Allowing for the second operating condition to be a subset of the first operating condition optimizes the utilization of the hole patterns involved in the operating conditions.

According to one or several embodiments there may be a first opening arrangement for admitting an airflow to the first hole pattern, and a second opening arrangement for admitting an airflow to the second hole pattern. The use of opening arrangements as opposed to more complex controllers facilitates a simple operation of the heat-nozzle arrangement.

Either opening arrangement may be readily blocked by the selector, acting as a valve. The blockage may be full or partial for reasons disclosed in the following.

In one or more embodiments the first operating position may correspond to the first opening arrangement and the second opening arrangement being fully open, and the second operating position may correspond to that the second opening arrangement and part of the first opening arrangement are blocked by the selector. By partially blocking the first opening arrangement it is ensured that there is no substantial increase in mass flow through the first hole pattern as a result of the second hole pattern being blocked, in instances where such increase is not desired.

The above effect may be generalized in that there may be, in one or more embodiments, a balance between the first opening arrangement and first hole pattern, and a balance between the second opening arrangement and the second hole pattern, are such that the pressure drop over the heat nozzle arrangement remains unchanged irrespective of if the first hole pattern or the second hole pattern is utilized.

One way of obtaining this is to include a bleeder valve upstream the nozzle assembly.

In one or more embodiments the heating nozzle-arrangement may comprise two or more nozzle assemblies, enabling heating of more than one packaging container at the time. The nozzle assemblies may be connected to the same distribution manifold to enable mutual control.

Also, when several nozzle assemblies are present a first nozzle may be arranged to supply hot air to an interior of a packaging container while a second nozzle arranged to supply hot air to an exterior of the packaging container.

In such an example the same selector may be utilized to partly block a flow of hot air into the first nozzle and into the second nozzle respectively.

BRIEF DESCRIPTION OF THE DRAWINGS

FIG. 1 is a schematic view of a step in the manufacture of a packaging container, e.g. a packaging container according to FIG. 2 or 3 to be described.

FIG. 2 is a partial view in perspective of a first packaging container to which the present invention may be applied.

FIG. 3 is a view similar to that of FIG. 2 of a second packaging container to which the present invention may be applied.

DETAILED DESCRIPTION OF EMBODIMENTS

Figure 4:
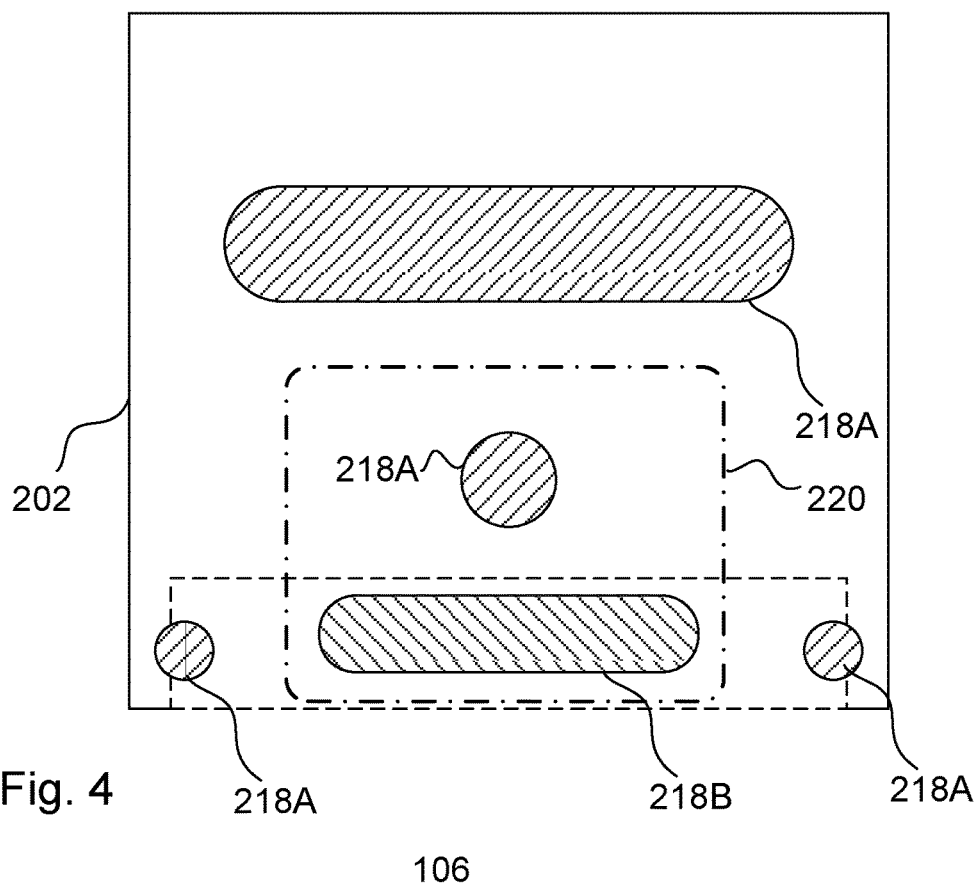
FIG. 4 is a schematic plan view of a heating nozzle included in a first embodiment of the present invention.

The next couple of paragraphs will treat the general working principle of a prior art heating-nozzle arrangement, since it has several features in common with a heating-nozzle arrangement of the present invention.

FIG. 1 illustrates a step in the manufacture of packaging containers having a gable-top configuration. A nozzle arrangement 100 comprising a nozzle head 102 and a supply line 104 for hot air is about to be lowered into a packaging container 106. The packaging container 106 has in previous steps been formed from a packaging-laminate sleeve, closed at one end, and filled with e.g. a beverage. The top end, now about to be folded and sealed, has been "pre-creased" or "pre-broken" to better submit to the correct shape when formed. In steps subsequent to the one shown in FIG. 1 the nozzle arrangement 100 will be lowered into the packaging container (any relative motion causing the same result is also possible), and hot air is delivered to the nozzle head 102 and exits the pattern of holes 110. The hole pattern is arranged in such a way that a suitable amount of heat is delivered to the correct areas of the top fin 112, or what is to be the top fin 112, of the packaging container 106. In this way the outermost polymer layer is transformed to a "tacky" state.

Next, the nozzle arrangement 100 will be pulled out of the packaging container 106 and a set of tools will press the top fin to a closed state, fusing one tacky area with another tacky area or with an area of different properties. Sealing of a packaging container is a crucial step in assuring an adequate shelf-life and a safe food product, and what has been described in a few sentences in the present description is the subject of considerate efforts within the packaging-container industry.

Closing in on the present invention it may be particularly suitable in situations where large scale difference in a first and a second flow field are desired, and one such example will be described referring to FIGS. 2 and 3. For ease of understanding the same reference numerals have been used for similar components, and "large-scale difference" should be construed within the context of the present application by means of the example below. Both drawings illustrate common opening configuration for gable-top packages 106. In FIG. 2 a separate opening 114 provided in the form of a screw cork, and in FIG. 3 an opening arrangement 114' provided by the folds of the package and the top fin itself. The latter opening arrangement 114' is referred to as "Easy Opening" within the product portfolio of AB Tetra Pak. Both configurations are generally produced in the same filling machine, but they have different requirements when it comes to the sealing of the top fin 112. For the configuration of FIG. 2 it is preferred to have a homogenous sealing strength for the entire top fin, without any weak spots, i.e. the application of heat to the top fin is essentially unhampered by the presence of the opening 114. This may imply an even heating of the top fin prior to sealing it. For the opening arrangement of FIG. 3 it is preferred to have a lower sealing strength in the area of the opening 114' to enable easy opening. This lower sealing strength may be accomplished in more than one way, i.e. by pre-treating the area with various means, yet one approach also involves applying less preheating to the area than to the other areas of the top fin 112, and the only straightforward way of doing this is to change the flow pattern of the hot air.

In prior art, when switching from sealing a configuration according to FIG. 2 to a configuration of FIG. 3 the entire nozzle supplying the preheating air had to be replaced. This replacement is a cumbersome procedure. The installed nozzle arrangement has to be removed manually, often in a hot state and under pressure of time, and replaced by the new configuration. During the replacement procedure hygienic areas may have to be breached resulting in that a cleaning operation needs to be performed. As will be evident from the following, with a device according to the present invention such an approach is no longer necessary. Instead of spending time and work effort on making a manual switch the selector may be operated from outside and the switch may be performed more or less on the fly. An example of an overly complex device that potentially could be used for the inventive purpose is disclosed in WO2005/15735A1, yet using the device disclosed in that application would necessitate a rebuild of the device as presented in the drawings of that application.

Figure 6:
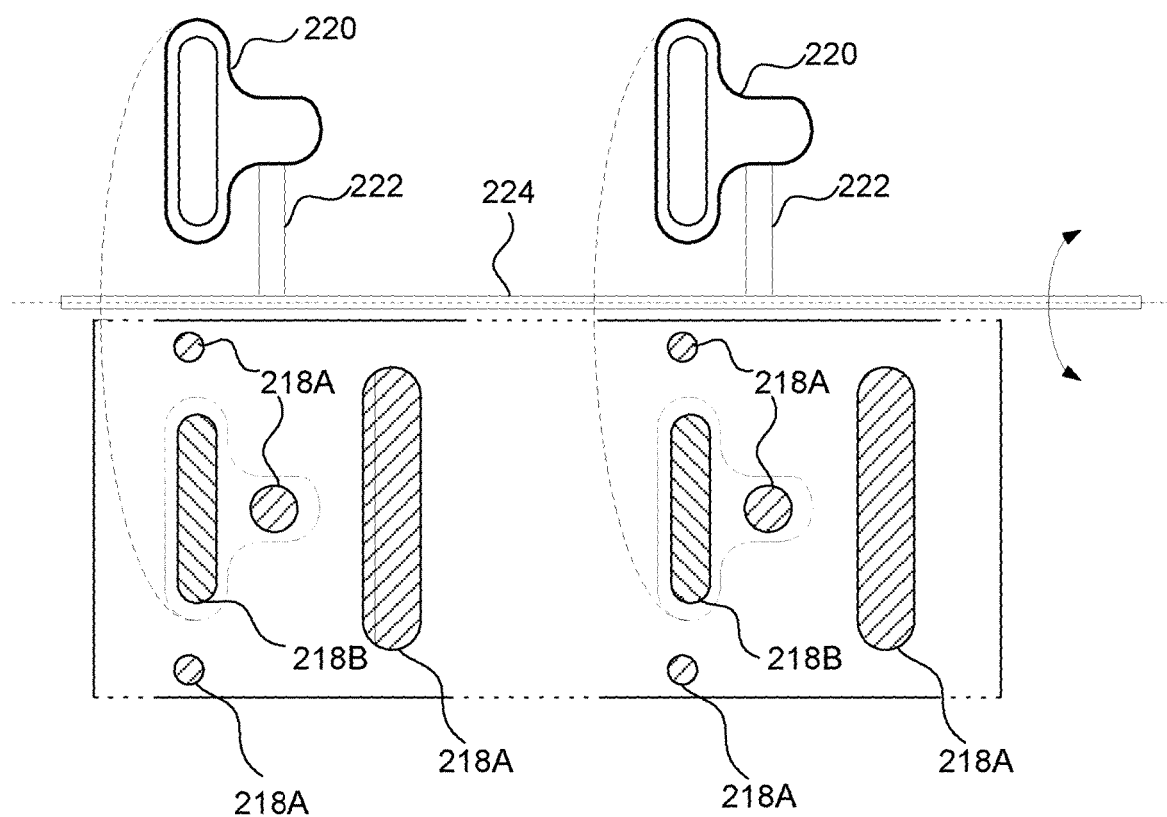
FIG. 6 is a schematic plan view of a heating-nozzle arrangement, at least a portion thereof, according to a second embodiment of the present invention.

FIG. 4 illustrates an upstream portion of a heating-nozzle arrangement, including opening arrangements 218A and 218B for guiding heated gas to a first 210A and second hole pattern 210B respectively. Compared with FIG. 1, a plate comprising the opening arrangements takes the place of the supply line in FIG. 1, or rather the supply line will instead guide the heated gas to a manifold for which a plate comprising the opening arrangements will constitute a delimiter between the manifold and the nozzle head. Not directly shown is a selector for selective blocking of the opening arrangements, yet an example of a set of openings that may be selectively closed by the selector is illustrated with the dash-dotted delimiting line 220, and an example of an actual selector is shown in FIG. 6. The opening arrangement 218A including the openings marked with A corresponds to the first opening arrangement associated with the first hole pattern 210A, and the opening arrangement 218B including the openings marked with B corresponds to the second opening arrangement associated with the second hole pattern 210B. According to the present embodiment there is one operating condition in which all openings 218A,B are open, and thus the entire hole pattern of the nozzle head 202 is utilized, hole pattern 210A as well as hole pattern 210B. Even if only very schematically described, this may correspond to the configuration used for a packaging container according to FIG. 2.

Figure 5:
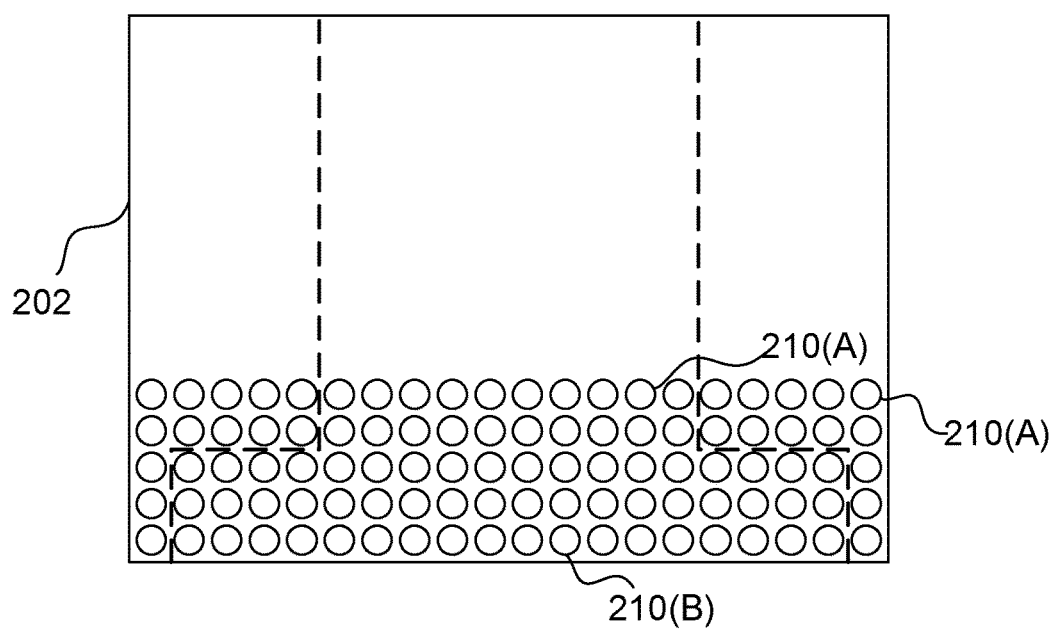
FIG. 5 is a side view of the heating nozzle of FIG. 4.

In a second operating condition the selector seals off the openings 218B leading to the second hole pattern 210B and some of the openings 218A leading to the first hole pattern 210A. In that sense the second operating condition is a subset of the first operating condition. In the schematic example the opening arrangement 218B leads to a manifold from which a subset of the entire hole pattern is accessed. In the embodiment of FIGS. 4 and 5 it is apparent from comparing the two drawings that the subset 210B (the second hole pattern) include most, or at least more than half, of the holes 210 in the lowermost three rows of the hole pattern. Assuming that that subset would be directed towards a portion of the top fin involved in the opening arrangement 114' of FIG. 3, sealing of the gas flow from the second hole pattern 210B would reduce the heat delivered to that portion of the fin 112, and thus affect properties of the resulting seal.

The opening arrangements 218A and 218B may preferably be machined out from the same plate, and they both emanate from a common distribution manifold. Hot gas is delivered to the distribution manifold and the position of the selector determines how the hot gas is directed from there.

In the illustrated embodiment the selector 220 may comprise a valve body 220 arranged on a turnable shaft 222 via a stem 224, as shown in FIG. 6. There is shown a portion of a heating-nozzle arrangement of an embodiment of the present invention. The purpose of the embodiment shown is to illustrate one possible operating principle for the selector 220, and the description should not be construed as limiting for the present invention as defined by the scope of the appended claims. The view of FIG. 6 is a principle one from inside a distribution manifold common for several nozzle arrangements. The opening arrangements are depicted as the ones already shown in relation to previous embodiments, in order to simplify understanding of the function of the selector 220. The plate providing one wall of the distribution manifold and the delimiter to the nozzle arrangements below has several nozzle arrangements arranged under it, i.e. the plate in which the opening arrangements 218A, B are located. The dotted lines in connection to the plate are meant to indicate that further opening arrangements may be present. For simplifying understanding the same reference numerals has been used as were used before in relation to previous embodiments. The shaft 222 may extend out from a protected hygiene area and readily operated between an open position and a closed position by turning the shaft by suitable means. In the illustrated embodiment this looks as though it has a 180° stroke, yet this is for illustrative purposes only, in a more realistic embodiment it would suffice that it raises enough not to cause any unwanted constraint of the gas flow (in its open position). In the present embodiment the selector is arranged to fully close the opening with which it engages, e.g. 218B in its closed position. In other embodiments it may be preferable that the selector only choke the flow of gas through the opening with which it engages, in order to enable a particular flow pattern. The illustrated selector 220 provides a rugged construction, suitable for the intended use. Also, the use of such a simple selector enables for the system to be used in the quite hostile environment of the filling machine and enables for the heating-nozzle arrangement to be retrofitted to existing production lines (e.g. filling machines) without significant rebuilds. Further, the selector 220 and its mechanics are easy to clean when such need arises. Having said this, it should be appreciated that there are numerous other alternatives for the selector, such as more complex valves of the type used in combustion engines, mass flow controllers arranged further upstream, etc, in particular if a retro-fittable solution is not required.

Since one success factor for the present invention relates to its "retrofittability", i.e. how simple it is in terms of technical alterations and time spent in connection with replacing existing nozzle arrangements with the inventive one. Merely closing the second opening arrangement could distort the flow pattern, and therefore, as the second opening arrangement is blocked to choke the supply to the second hole pattern a further portion of the first hole pattern is blocked as well to partly choke the supply to the first hole pattern not already blocked when blocking the second opening arrangement. In mathematical term this could be expressed as part of the relative complement to the second opening arrangement in the first opening arrangement being blocked. In this way a balance of the flow is maintained, e.g. such that the blockage of the second hole pattern does not result in a significant increase in flow through the first hole pattern. In the present example the selector in its blocking position is indicated by the dash-dotted line.

In the same or other embodiments another adjustment is made as well, also to ensure that the nozzle arrangement is retrofittable. The very same fan being used to force air through the nozzle arrangement may be simultaneously used to ensure a flow of air to another portion of the machine, such as to a bottom-sealing unit. Consider a situation where the flow is balanced for the nozzle arrangement being fully opened. If second hole pattern is not closed the pressure loss will increase for the nozzle arrangement, resulting in an increased flow through the bottom sealing unit. This feature is not desired, and it is preferred that a flow balance is maintained. In one embodiment this is accomplished by installing a bleeder valve (not shown) upstream the nozzle assembly. The bleeder valve ensures that a parameter such as pressure loss maintains constant regardless of which hole pattern is used. The bleeder valve may be delicately controlled, yet once the operations modes are set it may only need an on/off function. In one example the bleeder valve is controlled by an electromagnetic circuit coupled to a control means used to control the flow through the hole pattern. In this way the bleeder valve may be automatically actuated when needed.

Some filling machines where the present heat-nozzle arrangement may be applied have separate fans for separate functions, and in such a filling machine the issue may be resolved by altering the speeds of the fans instead.

The invention claimed is:

1. A heating-nozzle arrangement for heating a partly formed packaging container, the heating-nozzle arrangement comprising:
   one or more nozzle assemblies, arranged to direct a heated gas flow to portions of a packaging container to be sealed;
   an air-supply portion, arranged to supply a mass flow of heated air to the nozzle assembly;
   the nozzle assembly comprising a plurality of holes arranged in at least a first hole pattern and a second hole pattern; and
   a selector for directing the mass flow of heated air towards the first hole pattern or the second hole pattern respectively, the heating nozzle arrangement being operable according to a first operation condition in which the mass flow of heated air is directed to the first hole pattern and a second hole pattern so that the heated air flows out the holes in both the first and second hole patterns and a second operation condition in which the mass flow of heated air is directed to the first hole pattern only so that the heated air flows out the holes in only the first hole pattern, the selector being configured to change between the first and second operating conditions.

2. The heating-nozzle arrangement of claim 1, further comprising a first opening arrangement for admitting an airflow to the first hole pattern, and a second opening arrangement for admitting an airflow to the second hole pattern.

3. The heating-nozzle arrangement of claim 2, wherein the selector is configured to block access fully or partially to the first opening arrangement and the second opening arrangement for directing the mass flow of heated air.

4. The heating-nozzle arrangement according to claim 2, wherein there are two operating positions, a first operating position wherein the first opening arrangement and the second opening arrangement are fully open, and a second operating position where the second opening arrangement and part of the first opening arrangement are blocked by the selector.

5. The heating-nozzle arrangement of claim 2, wherein
   a balance between the first opening arrangement and first hole pattern, and
   a balance between the second opening arrangement and the second hole pattern,
   are such that pressure drop over the heating-nozzle arrangement remains unchanged irrespective of which of the first hole pattern and the second hole pattern is utilized.

6. The heating-nozzle arrangement of claim 5, further comprising a bleeder valve for modulating the pressure drop.

7. The heating-nozzle arrangement according to claim 2, wherein the first opening arrangement and the second opening arrangement extend from a mutual distribution manifold.

8. The heating-nozzle-arrangement of claim 1, wherein the arrangement comprises two or more nozzle assemblies.

9. The heating-nozzle-arrangement of claim 1, wherein the nozzle assembly comprise a first nozzle configured to supply hot air to an interior of a packaging container and a second nozzle configured to supply hot air to an exterior of the packaging container.

10. The heating-nozzle arrangement of claim 9, wherein the selector is configured to partly block a flow of hot gas into the first nozzle and into the second nozzle respectively.

11. The heating-nozzle arrangement of claim 1, wherein a control unit for controlling the selector is configured to also control a flow of air through the heating-nozzle arrangement.

12. The heating-nozzle arrangement of claim 1, wherein the nozzle assembly comprises a first nozzle and a second nozzle.

13. The heating-nozzle arrangement of claim 1, wherein a portion of the holes in the first hole pattern or in the second hole pattern are frustoconical, opening up in a flow direction.

14. A kit of parts comprising a heating-nozzle arrangement according to claim 1.

15. A heating-nozzle arrangement for heating a partly formed packaging container to be sealed, the heating-nozzle arrangement comprising:
   a nozzle head configured to direct heated air flow to portions of the packaging container to be sealed, the nozzle head comprising a plurality of holes arranged on a periphery of the nozzle head, the plurality of holes including plural holes in a first hole pattern and plural holes in a second hole pattern;
   a supply line connected to the nozzle head to supply a mass flow of the heated air to the nozzle head; and
   a movable selector that is movable between: i) one position in which the selector fully or partially blocks all of the plural holes in the second hole pattern so that the heated air is fully or partially blocked from flowing through all of the plural holes in the second hole pattern, and leaves open at least some of the plural holes in the first hole pattern so that the heated air flows through the at least some of the plural holes in the first hole pattern; and ii) another position in which the selector does not block any of the plural holes in the first hole pattern and does not block any of the plural holes in the second hole pattern so that the heated air flows through all of the plural holes in the first hole pattern and all of the plural holes in the second hole pattern.

16. The heating-nozzle arrangement of claim 15, further comprising a first opening arrangement for admitting an airflow to the first hole pattern, and a second opening arrangement for admitting an airflow to the second hole pattern.

17. The heating-nozzle arrangement of claim 16, wherein the selector is configured to block access fully or partially to the first opening arrangement and the second opening arrangement for directing the mass flow of the heated air.

18. The heating-nozzle arrangement of claim 16, wherein a balance between the first opening arrangement and first hole pattern and a balance between the second opening arrangement and the second hole pattern are such that pressure drop over the heating-nozzle arrangement remains unchanged irrespective of which of the first hole pattern and the second hole pattern is utilized.

19. The heating-nozzle arrangement of claim 18, further comprising a bleeder valve for modulating the pressure drop.

20. The heating-nozzle arrangement of claim 15, wherein a control unit for controlling the selector is configured to also control a flow of air through the heating-nozzle arrangement.

* * * * *